United States Patent
Clowes

(10) Patent No.: US 11,156,125 B2
(45) Date of Patent: Oct. 26, 2021

(54) CONTAINMENT ASSEMBLY

(71) Applicant: ROLLS-ROYCE plc, London (GB)

(72) Inventor: Martin Clowes, Derby (GB)

(73) Assignee: ROLLS-ROYCE PLC, London (GB)

( * ) Notice: Subject to any disclaimer, the term of this patent is extended or adjusted under 35 U.S.C. 154(b) by 76 days.

(21) Appl. No.: 16/299,826

(22) Filed: Mar. 12, 2019

(65) Prior Publication Data

US 2019/0301303 A1    Oct. 3, 2019

(30) Foreign Application Priority Data

Mar. 28, 2018 (GB) ...................... 1805006

(51) Int. Cl.

| F01D 25/24 | (2006.01) |
|---|---|
| F02K 3/06 | (2006.01) |
| F01D 25/28 | (2006.01) |
| F01D 21/04 | (2006.01) |
| F02C 7/36 | (2006.01) |
| F16H 1/28 | (2006.01) |

(52) U.S. Cl.
CPC ........... *F01D 25/24* (2013.01); *F01D 21/045* (2013.01); *F01D 25/28* (2013.01); *F02K 3/06* (2013.01); *F02C 7/36* (2013.01); *F05D 2220/323* (2013.01); *F05D 2240/14* (2013.01); *F05D 2260/311* (2013.01); *F05D 2260/40311* (2013.01); *F16H 1/28* (2013.01)

(58) Field of Classification Search
CPC ........ F01D 25/24; F01D 25/28; F01D 21/045; F01D 21/00
See application file for complete search history.

(56) References Cited

U.S. PATENT DOCUMENTS

| 4,534,698 A | 8/1985 | Tomich |
|---|---|---|
| 5,160,248 A | 11/1992 | Clarke |
| 6,364,603 B1 | 4/2002 | Czachor et al. |

(Continued)

FOREIGN PATENT DOCUMENTS

| EP | 1 104 837 A2 | 6/2001 |
|---|---|---|
| EP | 2 149 679 A2 | 2/2010 |

(Continued)

OTHER PUBLICATIONS

Great Britain search report dated Sep. 20, 2018, issued in GB Patent Application No. 1805006.2.

(Continued)

*Primary Examiner* — Michael L Sehn
(74) *Attorney, Agent, or Firm* — Brinks Gilson & Lione

(57) ABSTRACT

There is disclosed a containment assembly (500 for a gas turbine engine, comprising: an outer impact structure (56); an inner impact structure (54) disposed radially within the outer impact structure; wherein the outer impact structure and the inner impact structure axially extend between a fan portion (4) of the containment assembly corresponding to an axial location of a fan and a forward portion (2) of the containment assembly axially forward of the fan portion; and wherein at least one of the outer impact structure and the inner impact structure has a discontinuous profile between the forward portion and the fan portion so that there is a local reduction in compressive strength in the fan portion.

15 Claims, 5 Drawing Sheets

(56) References Cited

U.S. PATENT DOCUMENTS

| | | | | |
|---|---|---|---|---|
| 6,913,436 | B2* | 7/2005 | McMillan | F01D 21/045 |
| | | | | 415/173.4 |
| 8,029,231 | B2* | 10/2011 | Evans | F01D 21/045 |
| | | | | 415/9 |
| 8,047,764 | B2 | 11/2011 | Launders | |
| 9,194,299 | B2* | 11/2015 | Alarcon | F01D 21/045 |
| 9,533,454 | B2* | 1/2017 | Konigs | F01D 11/122 |
| 2004/0141837 | A1 | 7/2004 | McMillan et al. | |
| 2006/0179817 | A1 | 8/2006 | Maguire | |
| 2015/0003960 | A1* | 1/2015 | Totten | F04D 29/526 |
| | | | | 415/9 |
| 2016/0047255 | A1* | 2/2016 | Vargas | C23C 4/08 |
| | | | | 60/805 |

FOREIGN PATENT DOCUMENTS

| | | |
|---|---|---|
| EP | 2 876 289 A1 | 5/2015 |
| EP | 2 952 696 A1 | 12/2015 |
| EP | 2 985 424 A1 | 2/2016 |
| WO | WO 2015/094764 A1 | 6/2015 |

OTHER PUBLICATIONS

European Search Report, issued in EP Application No. 19 16 1501, dated Aug. 2, 2019, pp. 1-6, European Patent Office, Munich, Germany.

European Office Action, issued in EP Application No. 19161501.2, dated Jul. 8, 2020, pp. 1-4, European Patent Office, Munich, Germany.

\* cited by examiner

CONTAINMENT ASSEMBLY

CROSS-REFERENCE TO RELATED APPLICATIONS

This application is based upon and claims the benefit of priority from British Patent Application Number 1805006.2 filed 28 Mar. 2018, the entire contents of which are incorporated by reference.

BACKGROUND

A containment assembly may otherwise be known as or comprise a fan track liner. Known turbofan engines comprise a fan towards an upstream end of the engine, comprising a plurality of blades. Each fan blade is connected to a central fan disc, and in use is driven to rotate by a corresponding turbine stage of the engine.

Typically, such engines include a fan blade containment disposed circumferentially about the fan. In the rare event that a portion or the whole of a fan blade becomes detached from the fan disc (a fan-blade-off event), for example following a foreign object strike, the fan blade containment is provided to contain the fan blade.

A known containment assembly includes an outer casing and an impact structure comprising honeycomb material, such as aluminum honeycomb. During a fan-blade-off event, fan blade material impacts the honeycomb impact structure, which is compressed and/or crushed as it absorbs the energy of the impacting blade.

An impact structure of a containment assembly may be susceptible to being cut by fan blade material in a fan-blade-off event, rather than being crushed. For example, when the blade is metallic, or has a composite body with protective metalwork (e.g. leading edge, trailing edge or tip protective devices), the metallic material may tend to initially cut an impact structure. Whether the impact structure is cut or crushed may be a function of the compressive strength or crush strength of the impact structure and the inertia, material properties and geometry of the blade material.

SUMMARY

According to a first aspect of the disclosure there is provided a containment assembly for a gas turbine engine, comprising: an outer impact structure; an inner impact structure disposed radially within the outer impact structure; wherein the outer impact structure and the inner impact structure axially extend between a fan portion of the containment assembly corresponding to an axial location of a fan and a forward portion of the containment assembly axially forward of the fan portion; and wherein at least one of the outer impact structure and the inner impact structure has a discontinuous profile between the forward portion and the fan portion so that there is a local reduction in compressive strength in the fan portion.

The local reduction in compressive strength may be relative a comparative containment assembly having a continuous profile between the forward portion and the fan portion.

The discontinuous profile may be of a boundary of the outer impact structure opposing the inner impact structure. The boundary may be discontinuous so that it is recessed radially outwardly in the fan portion relative to the profile of the boundary in the forward portion.

The discontinuous profile may be a profile of the inner impact structure. The discontinuous profile may be of a boundary of the inner impact structure opposing the outer impact structure. In other words, the discontinuous profile may be of an outer boundary (i.e. radially-outer) of the inner impact structure.

The boundary may be discontinuous so that it projects radially outwardly in the fan portion relative to the profile of the boundary in the forward portion, to define a radial protrusion that is accommodated in a corresponding recess in the outer impact structure.

The boundary may be discontinuous so that it is recessed radially inwardly in the fan portion relative to the profile in the forward portion.

The discontinuous profile may be of an inner boundary of the inner impact structure. The boundary may be discontinuous so that it is recessed radially outwardly in the fan portion relative to the profile in the forward portion.

There may be a void adjacent the recessed portion of the boundary in the fan portion of the containment assembly. The term void is used herein to indicate a space that is completely empty (except for a gas) or functionally empty such that any contents therein have substantially no effect on the dynamic response of the containment assembly as compared with a vacuum or gas fill.

Alternatively, there may be a cavity adjacent the recessed portion between the inner impact structure and the outer impact structure, with a filler member disposed within the cavity, the filler member having a lower compressive strength than the recessed impact structure.

The discontinuous profile may be a profile of a radial thickness of the inner impact structure or of the outer impact structure.

The inner impact structure may comprise a low-density honeycomb material and the outer impact structure may comprise a high-density honeycomb material.

The outer impact structure and the inner impact structure may axially extend between the forward portion and an aft portion of the containment assembly which is aft of the fan portion. The discontinuous profile may be discontinuous in the fan portion relative to the profile in the forward portion and the aft portion.

The outer impact structure may be provided as a unitary body which extends from the forward portion to the fan portion. The inner impact structure may be provided as a unitary body which extends from the forward portion to the fan portion.

The outer impact structure may be provided as a unitary body which extends from the forward portion and through the fan portion to an aft portion of the containment assembly. The inner impact structure may be provided as a unitary body which extends from the forward portion and through the fan portion to the aft portion.

There may be a septum layer between the inner impact structure and the outer impact structure.

The discontinuous profile may be defined in the or each respective impact structure at a plurality of first angular segments of the containment assembly so that there is a local reduction in compressive strength in the fan portion at the first plurality of angular segments. The or each respective impact structure may have a substantially continuous profile between the forward portion and the fan portion at a plurality of second angular segments, and the first and second angular segments may be arranged in alternating relationship around the containment assembly.

According to a second aspect of the disclosure there is provided a gas turbine engine comprising a containment assembly in accordance with the first aspect of the disclosure.

The gas turbine engine may comprise a fan having an axial extent corresponding to the fan portion of the containment assembly.

The fan may comprise a plurality of fan blades, each having an aerofoil portion comprising composite material (in particular fibre reinforcement material in a matrix).

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forward-most) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being Jkg-1K-1/(ms-1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding. The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000m to 15000m, for example in the range of from 10000m to 12000m, for example in the range of from 10400m to 11600m (around 38000 ft), for example in the range of from 10500m to 11500m, for example in the range of from 10600m to 11400m, for example in the range of from 10700m (around 35000 ft) to 11300m, for example in the range of from 10800m to 11200m, for example in the range of from 10900m to 11100m, for example on the order of 11000m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
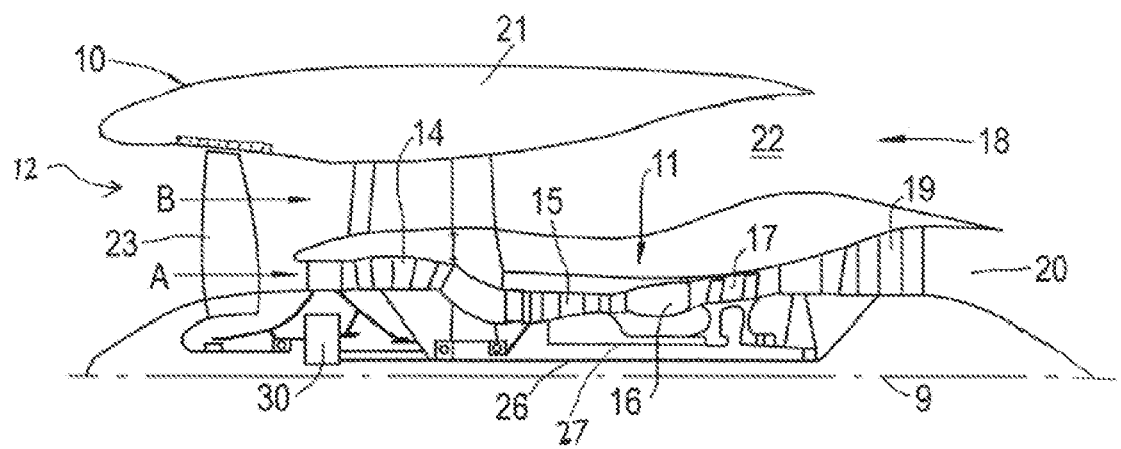
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
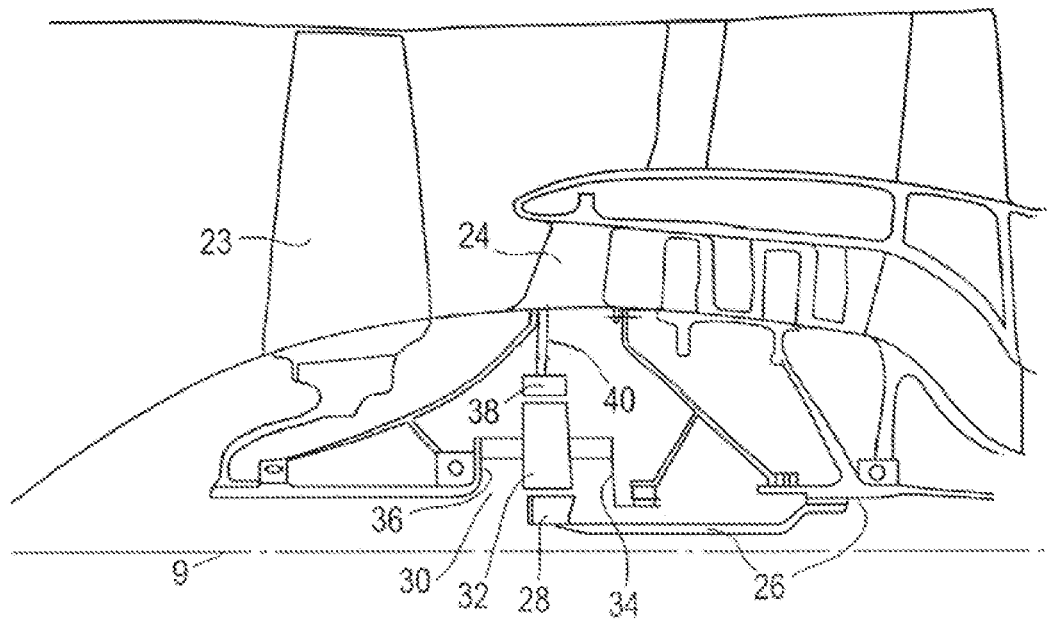
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gearbox 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
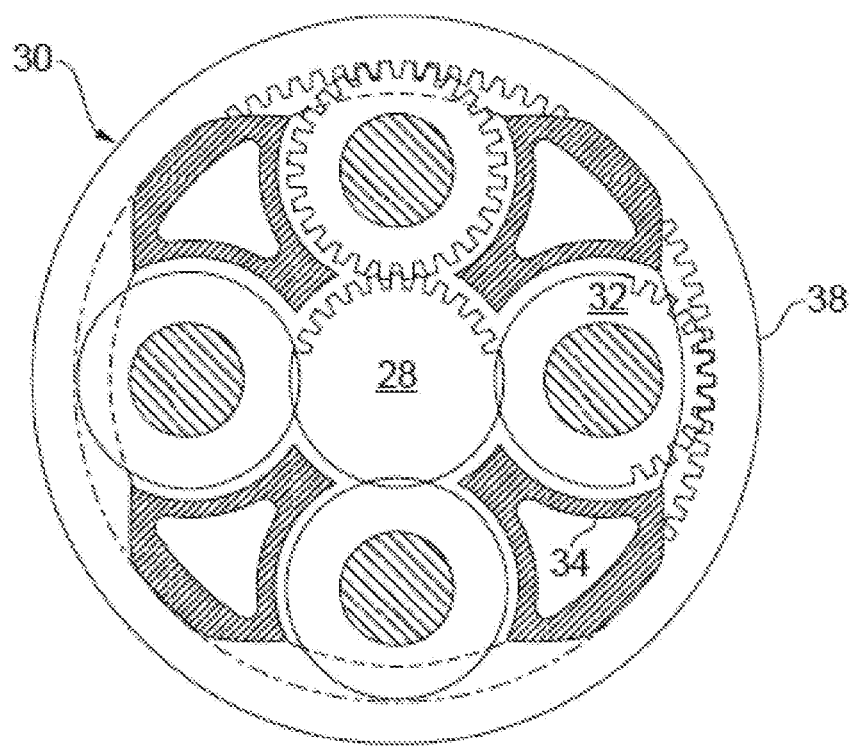
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure.

Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
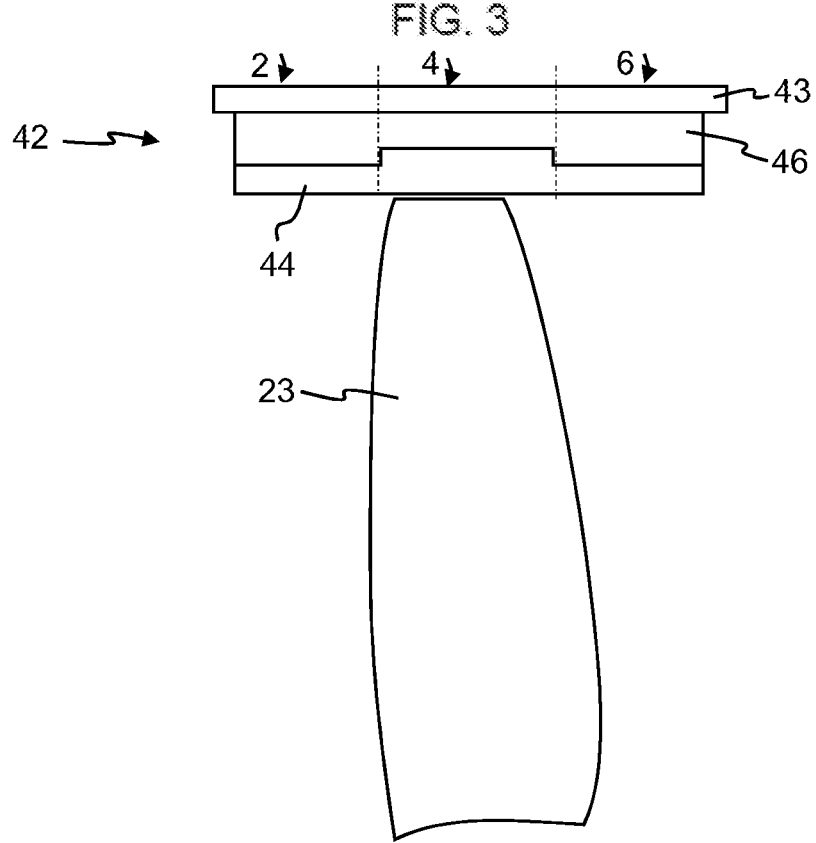
FIG. 4 is a partial schematic sectional side view of a containment assembly for a fan.

FIG. 4 schematically shows a partial cross-sectional side view of a gas turbine engine along a plane of constant angle with respect to the engine centreline (i.e. a plane in which the engine centreline lies), depicting an example containment assembly 42 disposed around a fan blade 23.

As shown in FIG. 4, in this example the containment assembly 42 comprises an inner impact structure 44 disposed radially within an outer impact structure 46. Both impact structures 44, 46 are provided radially within a casing 43.

Both the inner impact structure 44 and the outer impact structure 46 axially extend (i.e. along a direction parallel with the engine centreline) between a fan portion 4 of the containment assembly corresponding to the axial location of the fan 23 and a forward portion 2 of the containment assembly axially forward of the fan portion 4. In this particular example, both the inner impact structure 44 and the outer impact structure 46 axially extend from the forward portion 2 to an aft portion 6 which is axially aft of the fan portion 4.

As noted in the background of the disclosure, the containment assembly 42 is provided to contain, amongst other things, fan blade material that may be ejected from the fan in a fan-blade-off event.

A containment assembly may typically be designed to include one or more impact layers configured to crush and spread an impact load of fan blade material, to thereby slow the fan blade material in the containment assembly and prevent penetration of the casing.

The compressive strength of an impact structure may be determined by its material composition and configuration. For example, an impact structure may comprise honeycomb material, which may comprise aluminum or composite materials (e.g. carbon fibre reinforced composite CFRP or Nomex®, a poly(meta-phenylene isophthalamide)). Such honeycomb materials can be provided at different cell densities and sheet material thicknesses to achieve a suitable compressive strength.

It is thought that the dynamic interaction of fan blade material and an impact structure is a function of the properties of the impact structure (e.g. compressive strength) and the inertia, material properties and geometry of the fan blade material.

In some example interactions, fan blade material may impact an impact structure so that the impact structure deforms by collapsing or crushing. Such deformation of the impact structure may have the effect of increasing an impact area in the containment assembly (for example by causing cells neighbouring those under direct impact to deform or crush), to thereby spread the load of the impact and help avoid penetration of the fan blade material through the containment assembly.

In other example interactions, fan blade material may impact an impact structure so that it bisects (or cuts) the impact structure, such that an impact area in the containment assembly (at least initially) substantially corresponds to the location of direct impact without deformation of neighbouring regions of the impact structure.

Previously considered designs have focused on optimising the compressive strength of an impact structure so as to spread the impact load over an enlarged impact area. Such designs may be most effective when the impact structure resists bisection (cutting) behaviour, but rather compresses or crushes in response to an impact load.

The present disclosure includes examples of containment assemblies which may be optimised to admit or capture fan blade material in a failure event, such that the material is at least temporarily retained or embedded in the impact structure in the early stages of a failure event. It is thought that by admitting/capturing fan blade material in this way, forward ejection of fan blade material in the early stages of a failure event (i.e. out of the front of the gas turbine engine) may be prevented.

A particular design principle exemplified in the present disclosure is to weaken the compressive strength of an impact structure in the fan portion of the containment assembly, such that the fan portion of the containment assembly is configured to admit or capture fan blade material in a failure event, whether by bisection/cutting of the impact structure, or by deformation to crush or collapse (i.e. without cutting).

A reference to weakening or reducing compressive strength may imply a comparison with an alternative configuration of an impact structure. In the examples of the present disclosure, such a weakening or reduction in compressive strength is due to a discontinuous profile of an impact structure in the containment assembly between the forward portion and the fan portion. Accordingly, a reference to a reduction in compressive strength in the fan portion may be relative to a comparative structure having a continuous profile between the forward portion and the fan portion.

In some examples, the forward portion (and optionally an aft portion) may be more resilient to the impact of fan blade material than the fan portion. Accordingly, fan blade material admitted/captured in the fan portion may be arrested in the forward portion after initial capture in the fan portion. Otherwise, a configuration of the forward portion to have a relatively higher compressive strength than the fan portion may influence a direction of travel of fan blade material through the containment assembly during a failure event so as to prevent it travelling forward from the fan portion By initially capturing fan blade material during a failure event in the containment structure, and then arresting the fan blade material, it is thought that forward ejection of fan blade material at an initial stage of a failure event (for example by rebound off a high-strength impact structure) will be prevented, and the fan blade material arrested at the fan portion to be subsequently swept rearward by a following blade of the fan for ingestion into the engine or passing through a by-pass flow.

Figure 5:
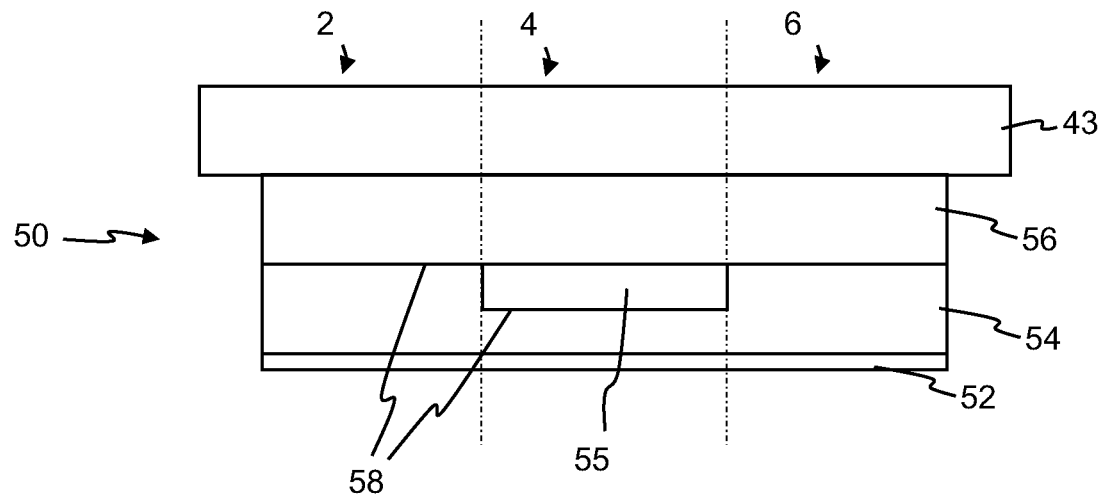
FIGS. 5-8 are schematic sectional side views of a containment assembly, for example in a plane of constant angle with respect to the engine centreline.

FIG. 5 shows a cross-sectional side view of an example containment assembly 50 comprising a casing 43, an outer impact structure 56 disposed radially within the casing 43, an inner impact structure 54 disposed radially within the outer impact structure 56, and an abradable gas-washed liner 52 radially within the inner impact structure.

In this example, the outer impact structure 56 comprises a relatively high-density cellular impact structure, such as an aluminum honeycomb material having a relatively high cell density, whereas the inner impact structure 54 comprises a relatively low-density cellular impact structure, such as an aluminum honeycomb material having a relative lower cell density.

Each of the inner and outer impact structures 54, 56 extend both circumferentially and axially (i.e. along an axis parallel with the engine centreline). In this example, each of the inner and outer impact structures 54, 56 have an axial extent extending from a forward portion 2 to an aft portion 6 through a fan portion 4 corresponding to the location of a fan blade in use (as described above with respect to FIG. 4). The inner and outer impact structures 54, 56 are each (individually) a unitary body over their axial extent from the forward portion to the aft portion. In other examples, an inner or outer impact structure may comprise discrete elements over any of the forward, fan or aft portions 2, 4, 6. In yet further examples, there may be no aft portion.

Each of the inner and outer impact structures 54, 56 have a radially inner boundary and a radially outer boundary, such that the outer boundary of the inner impact structure 54 opposes the inner boundary of outer impact structure 56.

In this example, the outer boundary 58 of the inner impact structure has a discontinuous profile between the forward portion 2 and the fan portion 4 configured so that there is a local reduction in compressive strength in the fan portion 4. In this example, the profile in the fan portion 4 is discontinuous relative to the profile in the forward portion 2 and the aft portion 6.

In particular, the outer boundary 58 is discontinuous so that it is recessed radially inwardly in the fan portion 4 relative to the profile in the forward portion 2 (and also relative the aft portion 6).

In this example, the outer boundary 58 of the inner impact structure 54 departs from the inner boundary of the outer impact structure 56 in the fan portion 4, such that there is a space defined between the respective boundaries of the impact structures 54, 56 in the fan portion 2. In this particular example, the space is a void 55 which is unfilled (except with optionally a gas such as air) in use.

The containment assembly has a lower compressive strength in the fan portion as a result of the discontinuous profile of the outer boundary 58 of the inner impact structure to form a recess, which has the effect of reducing the amount of material in the inner impact structure and which (at least in this example) is not compensated for by projection of the outer impact structure or other member of equal or greater compressive strength into the recess. The lower compressive strength is relative to a comparative containment assembly in which the profile of the inner impact structure is substantially continuous between the forward portion and the fan portion (and optionally the aft portion).

In other example variants of the containment assembly, the space may be a cavity filled with a filler member having a lower compressive strength than the recessed impact structure (i.e. a lower compressive strength than the inner impact structure). By virtue of the member in the void having a lower compressive strength than the inner impact structure, in such examples there is still a local reduction in the compressive strength of the containment assembly in the fan portion.

The inner impact structure 54 of the above example may also be considered to have a discontinuous profile of radial thickness between the forward portion and the fan portion.

In some examples, there may be a septum layer disposed between the inner impact structure and the outer impact structure. Such a septum layer may follow the profile of either the inner impact structure or the outer impact structure. References in the disclosure to the presence of a space, void or cavity between opposing boundaries of the inner and outer impact structures should not be interpreted to exclude the presence of the a septum layer between the impact structures in the region of the space/void or cavity.

Figure 6:
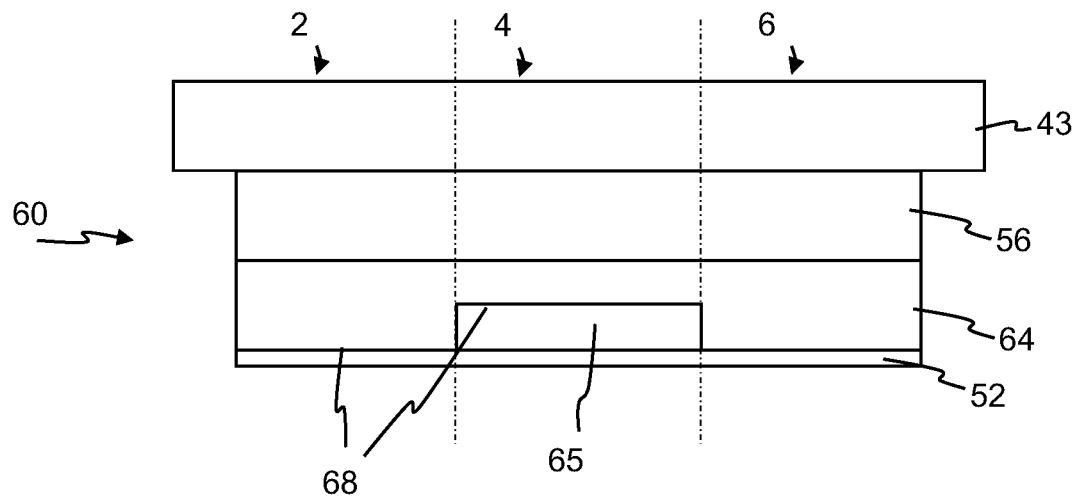

FIG. 6 shows a further example containment assembly 60 which differs from the containment assembly 50 described above with respect to FIG. 5 in that the inner boundary 68 (rather than the outer boundary 58) of the inner impact structure 64 has a discontinuous profile between the forward portion 2 and the fan portion 4.

In this example, the profile of the inner boundary 68 is discontinuous in the fan portion 4 relative the profile in the forward portion 2 (and also relative the aft portion 6) so that it is recessed radially outwardly in the fan portion 4.

In this example, there is a space 65 defined between the inner boundary 68 in the fan portion 4 and the abradable liner, which has a substantially continuous profile over the containment assembly between the forward portion 2 and the fan portion 4 (and in this example, to the aft portion 6).

As described above, the space can either be an unfilled void or a cavity filled with a filler member of lower compressive stress than the recessed impact structure (i.e. the inner impact structure 64, in this example). In either case, the effect is that the compressive strength of the inner impact structure, and thereby the containment assembly, is reduced in the fan portion 4 for admitting/capturing fan blade material in a failure event.

Figure 7:
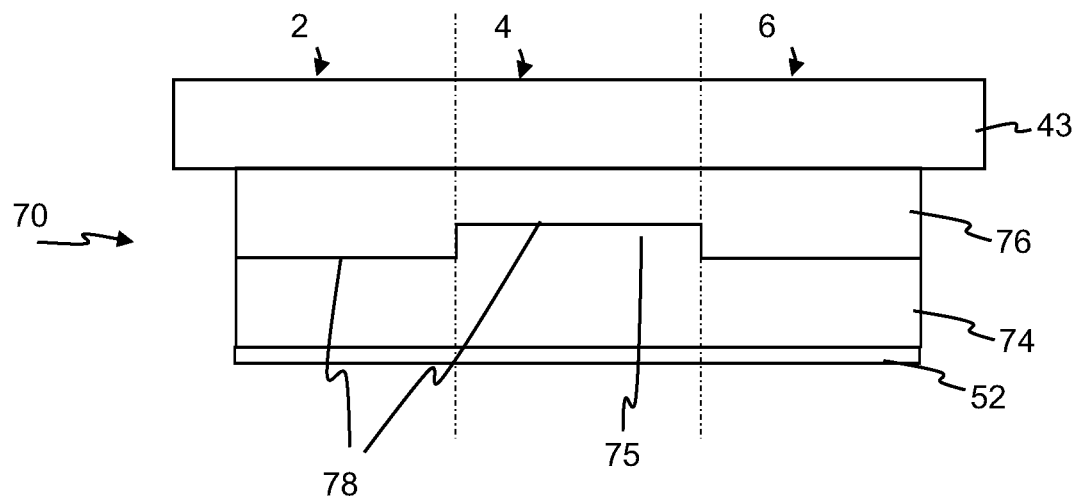

FIG. 7 shows a further example containment arrangement 70 which differs from the examples described above with respect to FIGS. 5 and 6 in that the interface between the inner impact structure 74 and the outer impact structure 76 (i.e. the outer boundary of the inner impact structure and the inner boundary of the outer impact structure) correspond to one another, and in that both are discontinuous.

In particular, the inner boundary of the outer impact structure 76 (which opposes the inner impact structure) is discontinuous so that is recessed radially outwardly in the fan portion 4 relative to the profile of the boundary in the forward portion 2 (and also relative the profile of the boundary in the aft portion 6).

Further, the outer boundary of the inner impact structure 74 (which opposes the outer impact structure 76) is discontinuous so that it projects radially outwardly in the fan portion 4 relative to the profile of the boundary in the forward portion 2 (and also relative the profile of the boundary in the aft portion 6), to thereby define a radial protrusion 75 that is accommodated in the corresponding recess in the outer impact structure 76.

As with the previous example containment assemblies, in this example the inner impact structure comprises honeycomb material of relatively lower cell density, whereas the outer impact structure comprises honeycomb material of relatively higher cell density.

Accordingly, the effect of the discontinuous profile (as compared with a comparative structure having a continuous profile) is that there is a local reduction in compressive stress in the fan portion 4, since there is a local reduction in the volume of high cell density material (having a higher compressive strength) with a consequent loss of overall compressive strength which is not compensated for by the equal additional volume of low cell density material (having a lower compressive strength).

Figure 8:
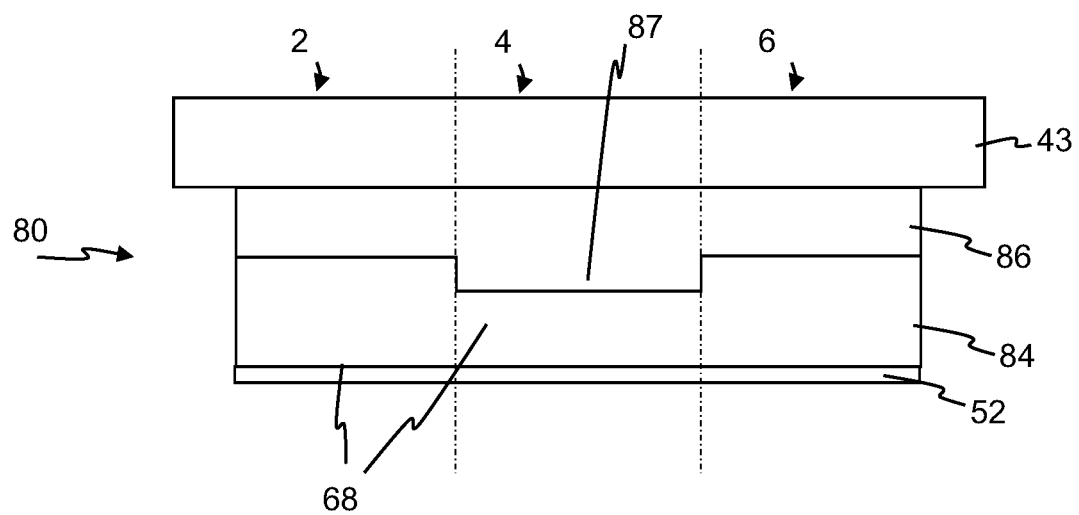

FIG. 8 shows a further example containment assembly 80 which differs from the example containment assembly 70 described above with respect to FIG. 7 in that the configuration of the inner and outer impact structures is inverted. In particular, in this example the discontinuous profile of the interface in the fan portion 4 is such that the outer impact structure 86 protrudes radially inwardly to define a protrusion 87 that is accommodated in a corresponding recess in the inner impact structure 84. In this example, the inner impact structure comprises relatively higher compressive strength material (e.g. honeycomb material of high cell density), whereas the outer impact structure comprises relatively lower compressive strength material (e.g. honeycomb material of low cell density).

Accordingly, there is a local reduction in compressive strength in the fan portion 4 of the containment assembly.

In any of the above examples, the discontinuous profile of one of the impact structures may be defined at a plurality of first angular segments of the containment assembly to provide the local reduction in compressive strength, but there may be a further plurality of second angular segments at which the profile of the respective impact structure substantially continuous profile instead. The first and second segments may be arranged in alternating relationship around the containment assembly. Accordingly, the local reduction in compressive strength may be intermittent around the fan portion of the containment assembly.

The effect of the alternating arrangement is that, around the circumference of the containment assembly, intermittent portions of the fan portion may be configured for enhanced material admission/capture, with adjacent portions having a higher compressive strength configured to arrest the fan blade material. Accordingly, there may be an initial stage of material capture in a failure event (i.e. to prevent forward ejection of material), followed by arrest of the material so that it may be swept rearward by a following blade of the fan.

Figure 9:
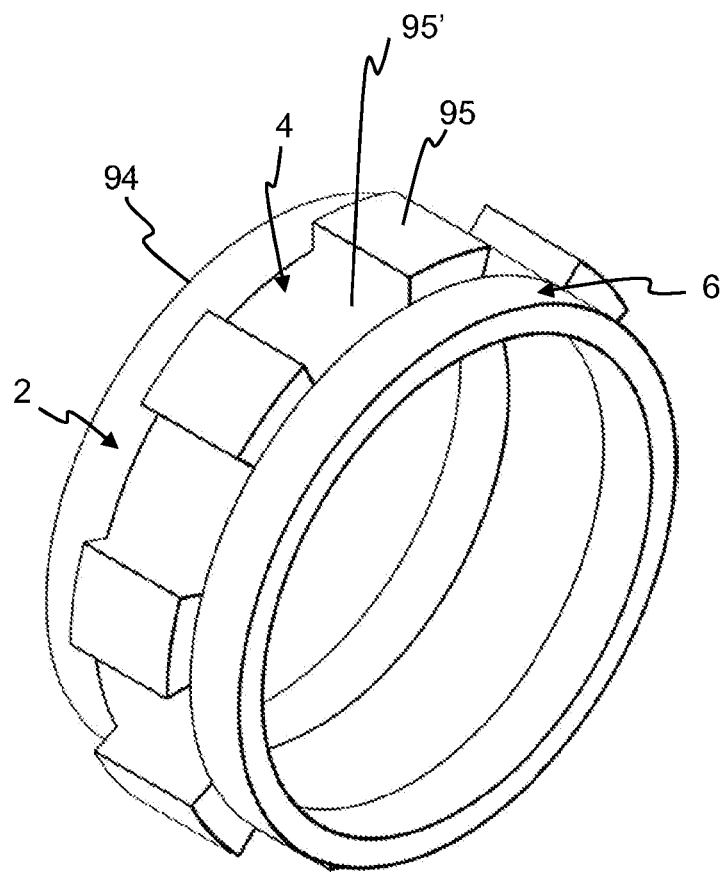
FIG. 9 is a schematic perspective view of an example impact structure of a containment assembly.

FIG. 9 shows a perspective view of an example inner impact structure 94 of an example containment assembly having alternating first segments 95 and second segments 95' as described above. The first segments 95 have radial protrusions which may be received in corresponding recesses in an outer impact structure, as described above with respect to the example containment assembly 70 of FIG. 7.

Any of the containment assemblies described above may be provided in a gas turbine engine, for example a gas turbine engine as described above with respect to FIGS. 1-3.

Whilst particular examples have been described in which there is a difference in the compressive strength of two structures because of their relative cell densities (as honeycomb materials), it will be appreciated that two structures may have different compressive strengths by virtue of any suitable differing parameter. For example, they may comprise different materials, have different wall thicknesses, cell structures or orientations.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A containment assembly for a gas turbine engine, comprising:
an outer impact structure;
an inner impact structure disposed radially within the outer impact structure;
wherein the outer impact structure and the inner impact structure axially extend between a fan portion of the containment assembly corresponding to an axial location of a fan and a forward portion of the containment assembly axially forward of the fan portion,
wherein each of the outer impact structure and the inner impact structure has a discontinuous profile between the forward portion and the fan portion so that there is a local reduction in compressive strength in the fan portion, an outer boundary of the inner impact structure contacting an inner boundary of the outer impact structure across the fan and forward portions to define an interface between the outer and inner impact structures, wherein, in the fan portion, the interface is radially recessed or radially protruding relative to the interface in the forward portion,
wherein an outer boundary of the outer impact structure and an inner boundary of the inner impact structure each comprise a continuous profile across the forward and fan portions along an axial direction, and wherein each of the outer impact structure and the inner impact structure comprises a honeycomb material, and wherein the honeycomb material of the outer impact structure has a different cell density than the honeycomb material of the inner impact structure.

2. The containment assembly according to claim 1, wherein the inner boundary of the outer impact structure is discontinuous so that it is recessed radially outwardly in the fan portion relative to the profile of the inner boundary of the outer impact structure in the forward portion.

3. The containment assembly according to claim 1, wherein the outer boundary of the inner impact structure is discontinuous so that it projects radially outwardly in the fan portion relative to the profile of the outer boundary of the inner impact structure in the forward portion to define a radial protrusion in the inner impact structure that is accommodated in a corresponding recess in the outer impact structure.

4. The containment assembly according to claim 1, wherein the outer boundary of the inner impact structure is discontinuous so that it is recessed radially inwardly in the fan portion relative to the profile in the forward portion.

5. The containment assembly according to claim 1, wherein the discontinuous profile is of a radial thickness of the inner impact structure or of the outer impact structure.

6. The containment assembly according to claim 1, wherein the inner impact structure comprises a low-density honeycomb material and the outer impact structure comprises a high-density honeycomb material, wherein the high-density honeycomb material has a higher cell density than the low-density honeycomb material.

7. The containment assembly according to claim 1, wherein the outer impact structure and the inner impact structure axially extend between the forward portion and an aft portion of the containment assembly which is aft of the fan portion; and wherein the discontinuous profiles are discontinuous in the fan portion relative to the profiles in the forward portion and the aft portion.

8. The containment assembly according to claim 1, wherein the outer impact structure is provided as a unitary body which extends from the forward portion to the fan portion; and/or wherein the inner impact structure is provided as a unitary body which extends from the forward portion to the fan portion.

9. The containment assembly according to claim 1, wherein the outer impact structure is provided as a unitary body which extends from the forward portion and through the fan portion to an aft portion of the containment assembly; and/or wherein the inner impact structure is provided as a unitary body which extends from the forward portion and through the fan portion to the aft portion.

10. The containment assembly according to claim 1, wherein the discontinuous profiles are defined in the inner and outer impact structures at a plurality of first angular segments of the containment assembly so that there is a local reduction in compressive strength in the fan portion at the first plurality of angular segments; and wherein, at a plurality of second angular segments of the containment assembly, the respective inner and outer impact structures have a substantially continuous profile between the forward portion and the fan portion, the first and second angular segments being arranged in alternating relationship around the containment assembly.

11. The gas turbine engine comprising a containment assembly in accordance with claim 1.

12. The containment assembly according to claim 1, wherein the inner impact structure comprises a high-density honeycomb material and the outer impact structure comprises a low-density honeycomb material, wherein the high-density honeycomb material has a higher cell density than the low-density honeycomb material.

13. A containment assembly for a gas turbine engine, comprising:

an outer impact structure;

an inner impact structure disposed radially within the outer impact structure;

wherein the outer impact structure and the inner impact structure axially extend between a fan portion of the containment assembly corresponding to an axial location of a fan and a forward portion of the containment assembly axially forward of the fan portion, wherein an abradable liner is disposed radially within the inner impact structure, the abradable liner having a continuous profile across the forward portion and the fan portion along an axial direction;

wherein at least one of the outer impact structure and the inner impact structure has a discontinuous profile between the forward portion and the fan portion so that there is a local reduction in compressive strength in the fan portion, wherein an outer boundary of the inner impact structure is discontinuous so that it is recessed radially inwardly in the fan portion relative to the profile in the forward portion, the outer boundary departing from an inner boundary of the outer impact structure in the fan portion to define a space, or wherein an inner boundary of the inner impact structure is discontinuous so that it is recessed radially outwardly in the fan portion relative to the profile in the forward portion, the inner boundary departing from the abradable liner in the fan portion to define a space, wherein each of the outer impact structure and the inner impact structure comprises a honeycomb material, and wherein the honeycomb material of the outer impact structure has a different cell density than the honeycomb material of the inner impact structure.

14. The containment assembly according to claim 13, wherein the space is an unfilled void.

15. The containment assembly according to claim 13, wherein the space is a cavity filled with a filler member.

* * * * *